(12) United States Patent
Lam

(10) Patent No.: US 11,670,300 B2
(45) Date of Patent: Jun. 6, 2023

(54) SPEECH RECOGNITION BIASING

(71) Applicant: X Development LLC, Mountain View, CA (US)

(72) Inventor: Daniel Alex Lam, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/811,425

(22) Filed: Jul. 8, 2022

(65) Prior Publication Data

US 2022/0343910 A1 Oct. 27, 2022

Related U.S. Application Data

(63) Continuation of application No. 16/878,822, filed on May 20, 2020, now Pat. No. 11,417,333, which is a
(Continued)

(51) Int. Cl.
*G10L 21/00* (2013.01)
*G10L 21/06* (2013.01)
(Continued)

(52) U.S. Cl.
CPC ............. *G10L 15/22* (2013.01); *B25J 13/003* (2013.01); *G06N 7/01* (2023.01); *G10L 15/26* (2013.01);
(Continued)

(58) Field of Classification Search
CPC ................................ G10L 21/06; G10L 21/00
See application file for complete search history.

(56) References Cited

U.S. PATENT DOCUMENTS 8,453,448 B2  5/2013 Pack et al.
10,438,587 B1 * 10/2019 Lam ........................ G10L 15/14
(Continued)

FOREIGN PATENT DOCUMENTS

CN         101136198 A  *  3/2008  ............. G10L 15/25

OTHER PUBLICATIONS sciencedaily .com [ online] "Object recognition for robots: Robots' maps of their environments can make existing object-recognition algorithms more accurate," Jul. 24, 2015 [ retrieved on Oct. 31, 2017] Retrieved from Internet: URL<https://www.sciencedaily.com/releases/2015/07/150724105436.htm> 6 pages.
(Continued)

*Primary Examiner* — Shreyans A Patel
(74) *Attorney, Agent, or Firm* — McDonnell Boehnen Hulbert & Berghoff LLP

(57) ABSTRACT

Systems and methods are described include a robot and/or an associated computing system that can use various cues about an environment of the robot to apply a bias to increase the accuracy of speech transcription. In some implementations, audio data corresponding to a spoken instruction to a robot is received. Candidate transcriptions of the audio data are obtained. A respective action of the robot corresponding to each of the candidate transcriptions of the audio data is determined. One or more scores indicating characteristics of a potential outcome of performing the respective action corresponding to the candidate transcription of the audio data are determined for each of the candidate transcriptions of the audio data. A particular candidate transcription is selected from among the candidate transcriptions based at least on the one or more scores. The action determined for the particular candidate transcription is performed.

20 Claims, 6 Drawing Sheets

Related U.S. Application Data continuation of application No. 16/568,506, filed on Sep. 12, 2019, now Pat. No. 10,672,398, which is a continuation of application No. 15/671,613, filed on Aug. 8, 2017, now Pat. No. 10,438,587.

(51) Int. Cl.
| | | |
|---|---|---|
| *G10L 15/22* | (2006.01) | |
| *B25J 13/00* | (2006.01) | |
| *G10L 15/26* | (2006.01) | |
| *G06N 7/01* | (2023.01) | |
| *G10L 15/183* | (2013.01) | |

(52) U.S. Cl.
CPC ...... *G10L 15/183* (2013.01); *G10L 2015/223* (2013.01); *G10L 2015/228* (2013.01)

(56) References Cited

U.S. PATENT DOCUMENTS

| | | | | |
|---|---|---|---|---|
| 10,672,398 | B1* | 6/2020 | Lam | B25J 13/003 |
| 2003/0158644 | A1* | 8/2003 | Basson | G08B 13/19647 |
| | | | | 701/49 |
| 2005/0043956 | A1* | 2/2005 | Aoyama | G10L 15/22 |
| | | | | 704/E15.04 |
| 2005/0177359 | A1* | 8/2005 | Lu | G10L 15/26 |
| | | | | 704/200 |
| 2006/0167696 | A1* | 7/2006 | Chaar | G10L 15/22 |
| | | | | 704/E15.04 |
| 2009/0210227 | A1* | 8/2009 | Sugiyama | G10L 15/22 |
| | | | | 901/46 |
| 2013/0238326 | A1* | 9/2013 | Kim | G06F 3/167 |
| | | | | 704/E15.001 |
| 2014/0249814 | A1* | 9/2014 | Nakano | G06V 10/464 |
| | | | | 704/235 |
| 2014/0316636 | A1* | 10/2014 | Hong | G05D 1/0274 |
| | | | | 901/1 |
| 2016/0161946 | A1* | 6/2016 | Wuth Sepulveda | G05D 1/0022 |
| | | | | 701/2 |
| 2017/0136621 | A1* | 5/2017 | Benaim | G06F 3/0484 |
| 2017/0270918 | A1* | 9/2017 | Moreno Mengibar | |
| | | | | G10L 15/197 |

OTHER PUBLICATIONS

"theconversation.com" [online] "Why robots need to be able to say 'No'," Apr. 8, 2016 [retrieved on Oct. 31, 2017] Retrieved from Internet: URL< http://theconversation.com/why-robots-need-to-beable-to-say-no- 55799> 3 pages.

Al-Dakkak et al. "Vocal Commands to a Robot by an Isolated Words Recognition System using HMM," Information and Communication Technologies, 2006, pp. 1219-1224.

Corona, Rodolfo, "An Analysis of Using Semantic Parsing for Speech Recognition," Undergraduate Honors Thesis, Computer Science Department, University of Texas, Austin, 2016, 36 pages.

Do et al. "Human-assisted sound event recognition for home service robots," Robotics and Biomimetics, 2016, 12 pages, vol. 3, No. 7.

Fransen et al. "Using Vision, Acoustics, and Natural Language for Disambiguation," International Conference on Human-Robot Interaction, Mar. 9-11, 2007, pp. 73-80.

Hacker, Martin, "Context-aware Speech Recognition in a Robot Navigation Scenario," Proceedings of the 2nd Workshop on Context Aware Intelligent Assistance, 2012, 14 pages.

Kobori et al. "Robust comprehension of natural language instructions by a domestic service robot," Journal of Advances Robotics, 2016, pp. 1530-1543, vol. 30, No. 24.

Mubin et al. "Improving Speech Recognition with the Robot Interaction Language," Disruptive Science and Technology, 2012, pp. 79-88, vol. 1, No. 2.

Vanzo et al., "Robust Spoken Language Understanding for House Service Robots," Prolibits (54) Dec. 2016, 6 pages.

* cited by examiner

SPEECH RECOGNITION BIASING

CROSS-REFERENCE TO RELATED APPLICATION

This application is a continuation of U.S. application Ser. No. 16/878,822, filed May 20, 2020, which is a continuation of U.S. application Ser. No. 16/568,506, filed Sep. 12, 2019, which is a continuation of U.S. application Ser. No. 15/671,613, filed Aug. 8, 2017, and the contents of the applications are incorporated by reference herein.

FIELD

This specification generally relates to robotic devices that are capable of performing automated speech recognition.

BACKGROUND

Personal assistant devices are electronic devices that can perform tasks or services for a user. Such tasks can be performed based on user input, location awareness, and the ability to access information from a variety of online sources, e.g., weather or traffic conditions, news, stock prices, and user schedules. Personal assistant devices function using a combination of mobile devices, application programming interfaces (APIs), and mobile applications that allow the user to perform tasks. A user can use a personal assistant device by providing voice instructions to either perform a one-time task, e.g., asking for directions to a nearby location, or ongoing tasks, e.g., schedule management.

SUMMARY

This specification generally describes a robot and/or an associated computing system that can use various cues about an environment of the robot to apply a bias to increase the accuracy of speech transcription. The bias applied varies according to a situation determined based on, for example, the objects at a robot's location, and the locations of the objects changes over time. Similarly, since the robot is mobile, the position of the robot with respect to various objects changes. As a result, the set of objects that are available for the robot to act on and the results of the robot acting on the objects will vary and result in varying biasing to speech recognition results.

The biasing may be done by adjusting speech recognition scores, biasing a language model, or through other operations. The environment data used for biasing a language model can include a map of the robot's surroundings, inventories of objects identified, and other context data. In addition to data describing the environment, the system can also take into account information indicating human interactions and potential impacts of actions that the robot could perform using on nearby objects. Candidate transcriptions can be passed through a grammar processing system to identify patterns that correspond to commands, and which may identify apps or routines capable of carrying out the identified commands.

For example, the system can select from among different candidate transcriptions based on expected results of a robot carrying out a command. For example, the system can determine which candidate transcriptions would represent a command to the robot, and can determine whether a particular interpretation of a command results in a reasonable or acceptable outcome. The system can use this analysis to avoid transcriptions that would result in negative effects if the command was carried out (e.g., "shake the can" is preferred over "break the can," "pick up the cable" is preferred over "pick up the table," and "throw the bottle away" is preferred over "throw the bottle at a wall"). In some implementations, the speech biasing is performed individually for specific speakers.

In performing speech biasing, the system can consider whether the results of an action are within safety parameters or not, whether the robot is able to generate a plan to carry out the command, and which potential commands are most feasible. The system can also take into account the current state or actions of the robot. For example, if the robot is moving, it may be much more likely to interpret audio as "stop" than "hop."

As another example, a robot can create an inventory of objects identified nearby, for example, objects currently in view, within a predetermined distance, or those identified within a certain amount of time. The robot can bias speech recognition toward this inventory. For example, having identified objects in a home, the robot can increase speech recognition likelihood scores for transcriptions that refers to objects in the inventory of items in the home. The fine-grained position of the robot may also be used. When a robot detects speech, the robot can use its position with respect to detected objects and the known locations of those objects (e.g., via a map or 3D position data) to apply a variable weight to speech recognition results. E.g., transcriptions that reference objects within 5 feet of the robot receive a high weight, transcriptions that reference objects between 5-10 feet away receive a smaller weight, and so on.

In one general aspect, a computer-implemented method includes the operations of: receiving audio data corresponding to a spoken instruction to a robot; obtaining candidate transcriptions of the audio data; determining a respective action of the robot corresponding to each of the candidate transcriptions of the audio data; determining, for each of the candidate transcriptions of the audio data, one or more scores indicating characteristics of a potential outcome of performing the respective action corresponding to the candidate transcription of the audio data; selecting a particular candidate transcription from among the candidate transcriptions based at least on the one or more scores; and performing the action determined for the particular candidate transcription.

Implementations may include one or more of the following optional features. For example, in some implementations, the method further includes the operations of: receiving context data that indicates (i) a location of the robot within a property, and (ii) one or more objects within a threshold proximity to the location of the robot; and the one or more scores are determined based at least on the received context data.

In some implementations, the context data is collected by one or more on-board sensors of the robot.

In some implementations, the one or more scores each represent a respective likelihood that performing the respective action will result in injury to a user that provides the spoken instruction to the robot.

In some implementations, the method further includes the operations of: determining, for each of the candidate transcriptions of the audio data, a confidence score that reflects a likelihood that the audio data will be transcribed using the candidate transcription; and biasing the confidence scores for the candidate transcription scores based at least on the one or more scores.

In some implementations, biasing the confidence scores for the candidate transcription scores includes the operations of: determining that the potential outcome of performing a particular action corresponding to a particular candidate transcription of the audio data is included within a set of undesirable outcomes that is associated with the robot; and reducing a confidence score for the particular candidate transcription of the audio data based on determining that the potential outcome of performing the particular action is included within the set of undesirable outcomes that is associated with the robot.

In some implementations, the method further includes the operations of: computing a recognition score for each of the candidate transcriptions; computing an impact score for each of the candidate transcriptions; and combining, for each of the candidate transcriptions, the recognition score and the impact score to compute a confidence score that reflects a likelihood that the audio data will be transcribed using the candidate transcription.

In some implementations, for each candidate transcription: the recognition score represents a likelihood that the candidate transcription represents an accurate transcription of the spoken instruction provided to the robot; and the impact score represents a likelihood that the potential outcome of performing a respective action corresponding to the candidate transcription is included among a set of undesirable outcomes that is associated with the robot.

Other versions include corresponding systems, and computer programs, configured to perform the actions of the methods encoded on computer storage devices.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
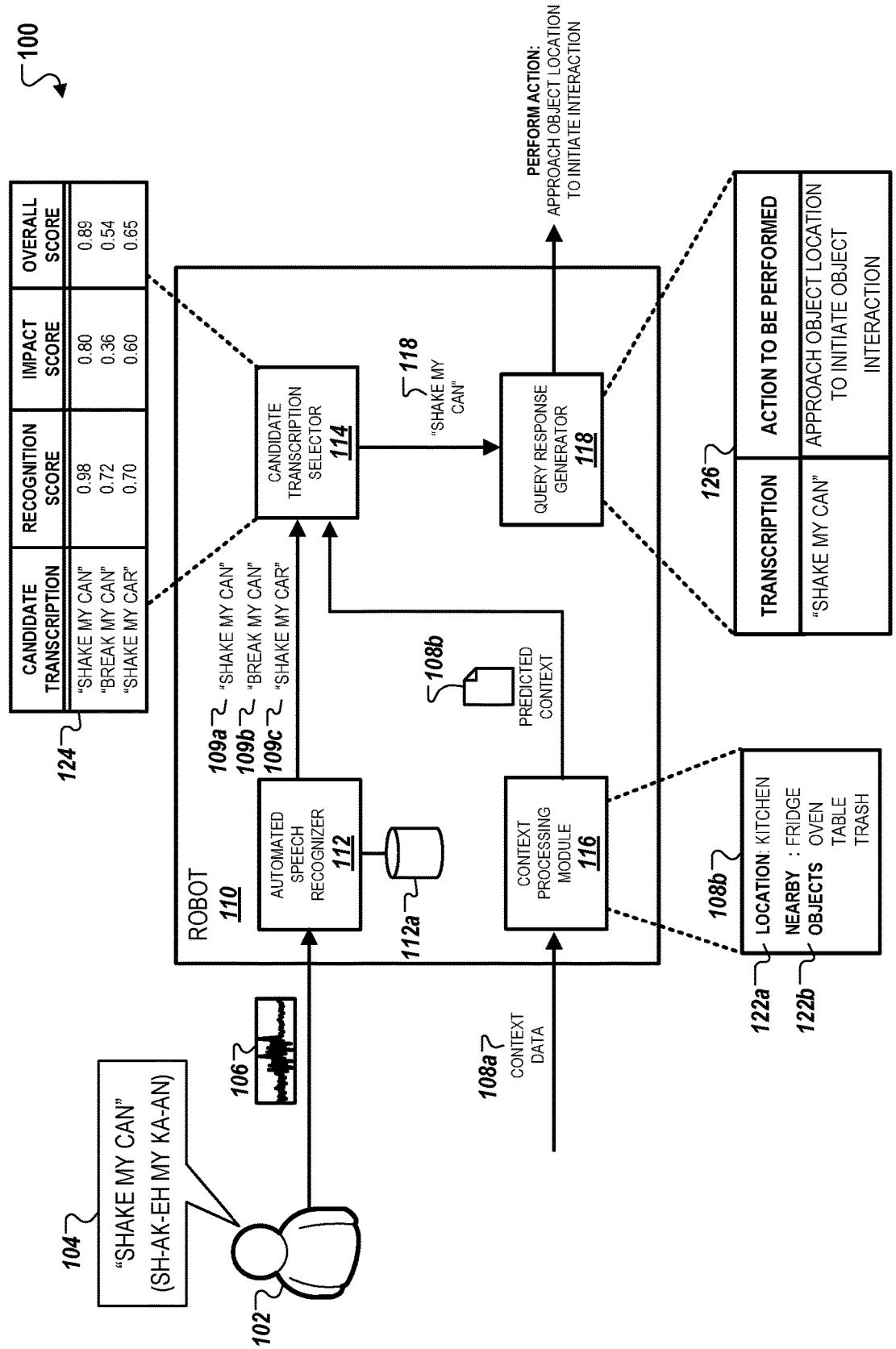
FIG. 1 is schematic diagram that illustrates an example of a system that can use environmental cues to increase the accuracy of speech transcription by a robot.

FIG. 1 is schematic diagram that illustrates an example of a system 100 that can use environmental cues to increase the accuracy of speech transcription by a robot. In general, the system 100 includes structural components arranged and connected to receive and process audio data corresponding to voice queries submitted by a user 102 to a robot 110. The system 100 can use various cues about an environment of the robot 110 to apply a bias to increase the accuracy of speech transcription.

The robot 110, in the example depicted in FIG. 1, includes an automated speech recognizer (ASR) 110, a context processing module 116, a candidate transcription selector 114, and a query response generator 118. In some implementations, the components of the robot 110 depicted in FIG. 1 can be implemented and/or arranged on an associated server system in communication with the robot 110 using, for example, a network connection. In such implementations, the biasing techniques depicted in FIG. 1 and discussed below are performed by on server system and communicated to the robot 110 over a network.

The robot 110 can represent a mobile electronic computing device that is capable of interacting with a user 102 and navigating about a property. For example, the robot 110 can perform actions in response to receiving spoken instructions provided by the user 102, output information responsive to voice queries submitted by the user 102, perform actions in response to detecting certain environmental cues, among other types of actions resulting from human-computer interactions. In some implementations, the robot 110 can be fully autonomous, e.g., operating autonomously without requiring any control by the user. For example, the robot 110 can periodically monitor the condition of a property and automatically determine certain actions to perform in response to detecting particular environmental cues, e.g., cleaning the kitchen floor based on determining that the user has recently cooked a meal. In some implementations, the robot 110 may be capable of interacting with physical objects within an environment based on receiving commands from the user 102, e.g., throwing out a piece of paper in a trash can.

The biasing technique depicted in FIG. 1 uses various environmental cues about an environment to increase the quality of speech recognition with respect to different one aspects. In one aspect, the mobile device 110 uses the biasing technique to improve the accuracy of recognizing the voice query 104. For example, the mobile device 110 can use the biasing technique to reduce the likelihood of mis-recognizing the voice query 104, e.g., incorrectly transcribing a voice query "SHAKE MY CAN" as "SHAKE MY CAR." In another aspect, the mobile device 110 uses the biasing technique to improve the outcome of performing an action corresponding to a candidate transcription for the voice query 104. For example, the mobile device 110 can use the biasing technique to reduce the likelihood that performing the action will cause injury to the user or damage to a property, e.g., preventing the execution of an action that throws a physical object.

The system 100 biases speech recognition by selecting a candidate transcription from among multiple candidate transcriptions for the voice query 104. Each candidate transcription corresponds to (or is associated with) a respective action to be performed by the robot 110 in response to receiving the voice query 104. For instance, different candidate transcriptions can correspond to different actions to be performed by the robot 110 in response to receiving the voice query 104. In this regard, the depicted biasing technique enables the system 100 to select the candidate transcription that allows the robot 110 to perform an appropriate action based on the environmental conditions of the robot. As discussed below, the selection of the candidate transcription can be based on, for example, the recognition accuracy of each candidate transcription, e.g., with the use of a recognition score, the potential impact of an action corresponding to each candidate transcription, e.g., with the use of an impact score.

Referring now to the example depicted in FIG. 1, the ASR 110 receives audio data 106 that encodes a voice query 104 provided by the user 102. The user 102 can submit the voice query 104 directly to the robot 110, e.g., by submitting a voice query that is received and processed directly by the ASR 112, or through a user device, e.g., by submitting a voice query on a computing device such as a smartphone, tablet computer, laptop computer, or a desktop computer (not depicted in FIG. 1), which then transmits the audio data 106 to the ASR 112. The voice query 104 can include various types of voice-enabled input such as voice searches, voice commands, or dictation that are recognized and processed by the ASR 112 using speech recognition techniques. As depicted in FIG. 1, the voice query 104 submitted by the user 102 includes a verbal command for "SHAKE MY CAN," which is encoded as audio data 106.

The ASR 112 uses recognition data 112a to automatically recognize speech within the audio data 106. For instance, the recognition data 112a can include an acoustic model, which the ASR 112 uses to identify an utterance based on the received audio data. In the example depicted, the ASR 112 determines that the audio data 106 includes the utterance "SH-AK-EH MY HA-ND" based on acoustic characteristics of the audio data 106 using the acoustic model). The recognition data 112a can also include a language model that the ASR 112 uses to generate a set of candidate transcriptions 109a, 109b, and 109c that represent recognition hypotheses for the utterance identified within the audio data 106. The language model can be used to compute a confidence score for each of the candidate transcriptions 109a-c. The confidence score computed for each candidate transcription can represent, for instance, the respective likelihood that a particular candidate transcription represents an accurate recognition hypothesis for the identified utterance given the acoustic attributes of the voice query 106 and terms specified within the language model. In the example depicted, the recognition score computed for candidate transcription 109a is "0.98," the recognition score computed for candidate transcription 109b is "0.72," and the recognition score computed for candidate transcription 109c is "0.70."

The context processing module 116 receives and process context data 108a in parallel to the audio data 106 being processed by the ASR 112 as discussed above. The context processing module processes context information indicated within the received context data 108a to generate a predicted context 108b. The predicted context 108b can represent environmental information of property where the robot 110 is located. For example, the predicted context 108b can identify a current location 122a of the robot 110 within a property and a set of nearby objects 122b that are within a threshold proximity to the current location of the robot 110 within the property. In the example depicted in FIG. 1, the predicted data 108b identifies that the robot 110 is presently located in the kitchen of the property and that the nearby objects include a fridge, an oven, a table, and a trash bin.

Although not depicted in FIG. 1, in other instances, the context data 108a can be used to identify additional information specified within the predicted context 108b. For example, the context data 108a can indicate recent actions performed by the robot 110, e.g., trajectory of movement, prior actions performed, etc. In other examples, the context data 108 can indicate prior queries submitted by the user 102. In some other examples, the context data 108a can specify recently detected activities within the present environment of the robot 110, e.g., sensor events corresponding to detected user activity, changes to positions of objects within the environment, changes to the operations of nearby devices, among others. In such instances, the context data 108a can not only be used to determine static environmental information such as those depicted in FIG. 1, but also identify dynamic environmental information that represent time-dependent patterns associated how the environment adjusts over a period of time. For example, the context data 108a can be used to determine if an environment is expected to have heavy user activity within it based on recently detected user activity in a nearby location of the property and/or the detection of environmental activity that is likely to involve a nearby object within the environment.

The candidate transcription selector 114 receives data indicating the candidate transcriptions 109a-c identified by the ASR 112 and data indicating the predicted context 108b determined by the context processing module 116. The candidate transcription selector 114 processes the obtained data and a set of computed scores specified within a table 124 that are used, in this example, to select a candidate transcription from among the candidate transcriptions 109a-c to transcribe the voice query 104.

In the example depicted in FIG. 1, the computed scores include a "RECOGNITION SCORE," an "IMPACT SCORE," and an "OVERALL SCORE." The recognition scores, in this example, represents determined likelihood that a particular candidate transcription represents an accurate transcription for the voice query 104 based on a set of acoustic features extracted from the audio days 106. For example, the recognition scores can be computed by the ASR 112 when performing speech recognition on the audio data 106 to identify the candidate transcriptions 109a-c using the recognition data 112a.

The impact scores can generally represent a determined likelihood that transcribing the voice query 104 using a particular candidate transcription will result in a potential outcome that impacts the user 102. In the examples depicted in FIG. 1, the value of the impact scores represent a likelihood that performing an action corresponding to the candidate transcription will not cause physical damage to the object. For example, the impact score computed for the candidate transcription 109b has a value of "0.36," which is lower than the value of the impact score computed for the candidate transcription 109a because the system predicts that breaking a user's can, as specified by the candidate transcription 109b, is more likely to result in object damage than shaking the user's can, as specified by the candidate transcription 109a.

As shown in FIG. 1, the recognition scores and the impact scores are combined for each candidate transcription to compute an "OVERALL SCORE." The value of each overall score, in this example, is an average of the recognition score value and the impact score value with respect to a particular candidate transcription. The overall scores are therefore used as cumulative quality metrics that are used to select the most suitable candidate transcription among the multiple candidate transcriptions 109a-c. For example, the candidate transcription selector 114 selects the candidate transcription 109a as a selected transcription 118 for the voice query 104 based on it having the highest overall score from among all of the candidate transcriptions. In this example, the overall score is used to determine that the candidate transcription 109a has the most accurate recognition (e.g., represented by the recognition score value) and the highest likelihood of not causing physical damage to an object (e.g., represented by impact score value). In other examples, the overall score can be used to avoid the selection of candidate transcriptions that represent accurate transcriptions of a voice query but are otherwise determined to result in negative potential impacts to the user 102. In this regard, the candidate transcription selector 114 selects a transcription not only on its recognition accuracy but on its potential impact on the user.

In various implementations, the impact scores, and the values assigned to them, can be used to represent different types of potential impacts of the robot 110 performing actions corresponding to the candidate transcriptions. For example, the impact scores can represent both a likelihood of a negative potential impact resulting from performing actions, e.g., causing physical damage to an object, causing physical injury to the user, as well as a likelihood of a positive impact resulting from performing the actions, e.g., performing an action that is responsive to the user's request and/or command to perform the action. The potential impact can be associated with a user, e.g., negative and/or positive impacts on the user 102, associated with a property, e.g., negative and/or positive impacts on the present condition of a property, or other types of attributes or objects that are nearby the robot 110.

Additionally, the impact scores can represent broad classes of effects resulting from the robot 110 performing actions corresponding to the candidate transcriptions. In some examples, the impact scores can represent safety, risk, or likelihood of harm the user 102 as discussed above. In other examples, the impact scores can represent likelihood of property damage or the potential amount of damage to a property where the robot 110 is location.

In some other examples, the impact scores can represent whether the potential impact of an action is reversible, e.g., adjustment to a location of an object, or irreversible, e.g., permanent damage that requires repair and/or replacement of an object. In other examples, the impact scores can represent other types of aspects associated with the potential impact of an action such as the financial cost of performing the action, the degree to which the action matches a pattern of prior actions, relevance of the action to a command received from the user 102, or feasibility of the robot 110 to perform the specified action (e.g., degree to which the robot 110 can actually accomplish a task given the capabilities of the robot, of the occurrence of certain environmental conditions).

The use of different impact scores in various circumstances, as discussed above, can be adjusted based on, for example, the action to be performed, properties of objects associated with the action, and/or the current environmental conditions nearby the robot 110. For example, the robot 110 may use different types of impact scores based on whether the voice query 104 is a request for information or a command to perform an action. In another example, the robot 110 may use different types of impact scores when the robot 110 is located in the kitchen of a property and when the robot 110 is located in a bedroom of the property. In some other examples, the robot 110 may use different types of impact when the action to be performed involves user interaction and when the action to be performed does not involve user interaction.

In each of these different circumstances discussed above, the robot 110 may combine the recognition scores and the impact scores in different ways to improve the quality of speech recognition for the particular voice query received. For example, if the impact scores represent a likelihood of a negative potential impact resulting from performing an action, then values of the impact scores can be used to bias the recognition scores to reduce the selection of candidate transcriptions that are determined to have high likelihoods of a negative potential impact, e.g., using a negative biasing technique. Alternatively, if the impact scores represent a likelihood of a positive potential impact, then values of the impact scores can be used to bias the recognition scores to increase the selection of candidate transcriptions that are determined to have high likelihoods of a positive potential impact, e.g., using a positive biasing technique. The robot 110 may also combine the recognition scores and the impact scores in different ways to compute the overall scores, e.g., using an averaging technique, using a weighting technique, etc.

In some implementations, multiple impact scores can be computed for each candidate transcription. In such implementations, each individual impact score can represent a different type of potential impact of the robot 110 performing an action corresponding to a candidate transcription. For example, the candidate transcription selector 114 can compute a first impact score representing the likelihood of causing physical injury to the user, a second impact score representing the likelihood of successfully completing the specified action, e.g., feasibility of performing the action, and a third impact score representing the likelihood that the performed action will be responsive to the query submitted by the user. The multiple impact scores can be combined with the recognition score to compute an overall score in a similar manner similar as the various score combination techniques described throughout.

The query response generator 118 obtains the transcription 118 selected by the candidate transcription selector 114 and determines an action corresponding to the selected transcription 118. As shown with the example depicted in FIG. 1, table 126 specifies an action that causes the robot 110 to approach the location of an object to initiate an object interaction. In this example, the query response generator 118 enables the robot 110 to perform an action that is determined for the selected transcription 118, e.g., initiating a an object interaction in response to transcribing the voice query 104 as "SHAKE MY CAN."

In some implementations, the query response generator 118 may select other types of actions for the robot 110 to perform based on selecting a transcription for the voice query 106. For example, the voice query 104 can be a request for information, e.g., a query asking for the local weather. In this example, the voice query 104 can be transcribed in a manner such that the action to be performed within the table 126 is providing a speech output that provides the requested information, e.g., a speech query that provides the local weather determined from an online resource. In some other examples, the voice query 104 can be a command for the robot 110 to perform a specified action, e.g., a command to clean the kitchen of a property. In this example, the voice query 104 can be transcribed in a manner such that the action to be performed within the table 126 is determined based on the physical conditions of the property, e.g., present location of the robot 110 and/or nearby objects within a proximity to the present location.

Although the biasing technique illustrated in the example depicted in FIG. 1 is performed using the selection of a candidate transcription from among multiple candidate transcriptions for a voice query, in other implementations, the system 100 is capable of using other types of biasing techniques to improve the speech recognition of the voice query 104. In some implementations, the system 100 is capable additionally, or alternatively, biasing a language model used to generate a candidate transcription for the voice query 104. For example, the system 100 may increase and/or decrease probabilities associated with certain n-grams within the language model based on, for instance, environmental information indicated within the context data 108a, e.g., the present location 122a and nearby objects 122b. In other implementations, the system 100 may bias the recognition scores computed for multiple candidate transcriptions using the environmental information using the impact scores as discussed above.

In some implementations, the system 100 may bias the recognition scores based on prior interactions with objects and/or the user, or prior interactions with user devices associated with other users. For example, if the user recently search a specific kind of apple on a smartphone, or has a stored preference based on submitting prior voice queries to the robot 110, the system may positively bias speech recognition of the candidate transcriptions towards terms that are associated with the specific kind of apple.

Figure 2:
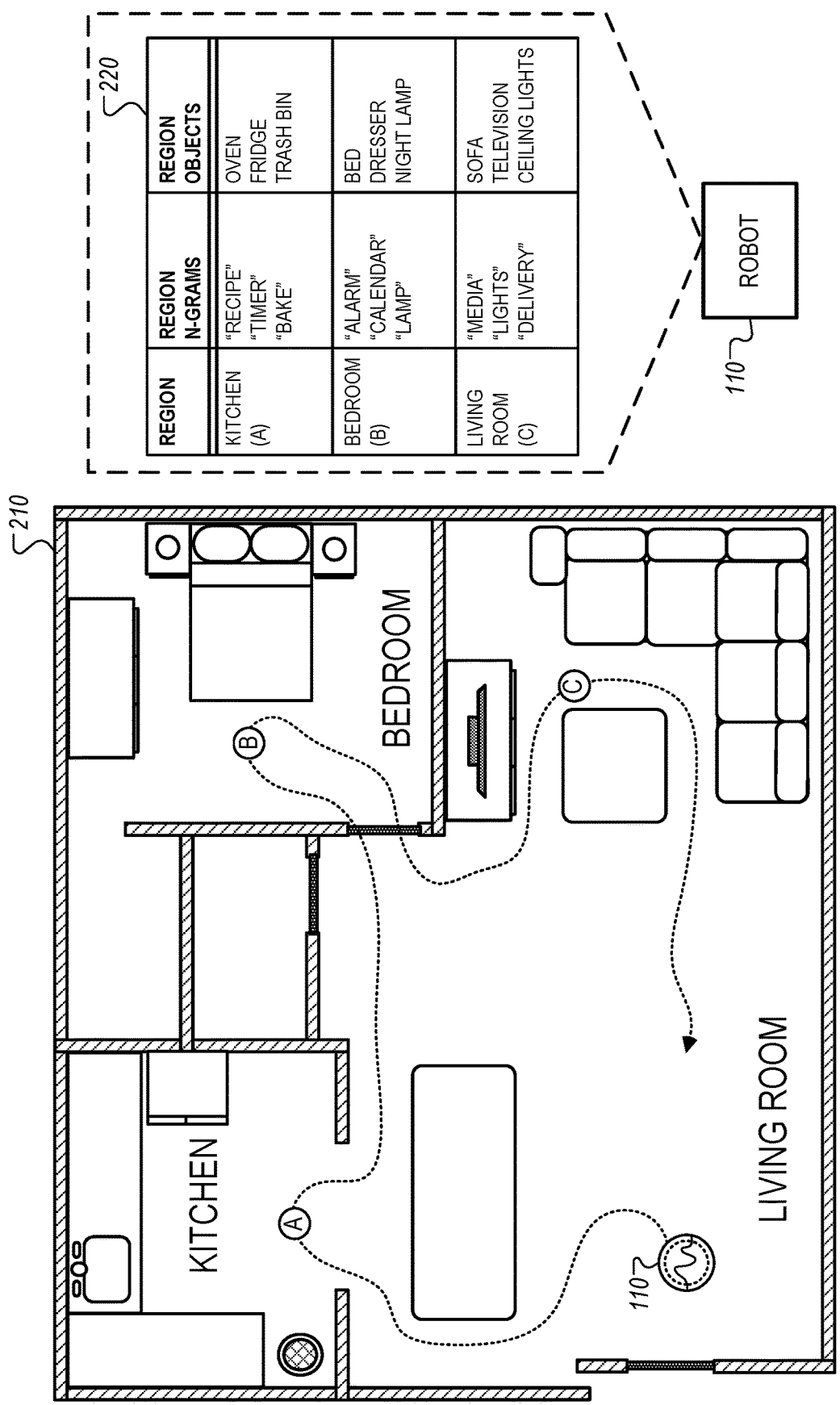
FIG. 2 is a schematic diagram that illustrates an example of biasing technique used by a robot based on the location of the robot within a property.

FIG. 2 is a schematic diagram that illustrates an example of biasing technique used by the robot 110 based on the location of the robot 110 within a property 210. In the example depicted, the robot 110 creates an inventory 220 of objects detected in different regions of the property 210. The robot 110 biases speech recognition of voice queries toward the inventory 220 to, for instance, increase speech recognition likelihood scores for transcriptions to objects in the inventory 220.

In the example depicted in FIG. 2, the property 210 includes three distinct regions including "KITCHEN," "BEDROOM," and "LIVING ROOM." Each region is identified within the inventory 220 and associated with a set of "REGION N-GRAMS" and "REGION OBJECTS." In this example, region n-grams refer to terms and/or phrases that are likely to be included in queries received by the robot 110 in a corresponding region of the property. For example, the inventory 220 specifies n-grams "RECIPE," "TIMER," and "BAKE" for the kitchen since queries received by the robot 110 are likely to refer to certain commands that include these n-grams, e.g., a user requesting a recipe for cooking a certain meal, the user requesting the robot 110 to set a timer while cooking, etc. In this regard, the inventory 220 specifies n-grams that are likely to be included in queries received by the robot 110 in different regions of the property.

The inventory 220 also specifies a set of objects that have been identified with each region of the property 110. For example, the inventory 220 specifies objects "OVEN," "FRIDGE," and "TRASH BIN" which were identified by the robot 110 within the kitchen, objects "BED," DRESSER," and "NIGHT LAMP," which were identified in the bedroom, and objects "SOFA," "TELEVISION," and "CEILING LIGHTS," which were identified in the living room. The objects may be identified during an initial registration phase when the robot 110 scans the physical environment of the property 210 and uses object classification techniques to identify the presence of objects within specified regions of the property. The robot 110 may periodically scan the property 210 to identify, for example, changes to the locations of previous identified objects within the property 210, or detect newly identified objects within the property 210.

In some implementations, the robot 110 additionally stores a three-dimensional spatial model of the property 101. The spatial model can represent spatial attributes, e.g., depth, topology, etc., of the indoor environment. For example, the spatial model can identify spatial boundaries such as walls, objects of interest such as doors, windows, or pathways between multiple regions of the property. In such implementations, the robot 110 can be capable of using heuristics and/or object detection techniques to identify and extract features that are present within the spatial model. For example, the robot 110 can be capable of differentiating between movable objects and fixed furniture, use geospatial scanning techniques to identify color or texture information of detected objects and surfaces within the property. In this regard, the spatial model can be used as a topological representation of the indoor environment of the property 210 that assists the robot 110 in adjusting the execution of commands related to identified objects.

In the example depicted in FIG. 2, the robot 110 uses the inventory 220 to bias the speech recognition of voice queries according to its present location within the property 210. The robot 110 may positively bias the selection of candidate transcriptions that include region n-grams specified for its present location within the property 201.

For instance, when receiving a query at location (A), the robot 110 can bias speech recognition to increase the likelihood of selecting candidate transcriptions that include n-grams "RECIPE," "TIMER," and "BAKER." In addition, the robot 110 can also bias speech recognition to perform actions that are specifically related to the objects "OVEN," "FRIDGE," and "TRASH BIN." In this instance, when the robot 110 detects speech, e.g., through a voice query, the robot 110 uses its position to increase the transcription of the detected speech toward n-grams and/or objects specified for the kitchen within the inventory 220. In another instance, when receiving a query at location (B), the robot 110 can bias speech recognition to increase the likelihood of selecting candidate transcriptions that include n-grams "ALARM," "CALENDAR," and "LAMP" and toward objects "BED," "DRESSER," and "NIGHT LAMP."

The robot 110 can use the location-based biasing technique discussed above to improve the accuracy of speech recognition for ambiguous voice queries. For example, a voice command "TURN OFF" that is received in the bedroom can be transcribed as "TURN OFF LAMP" with a corresponding action for the robot 110 to turn off the object "NIGHT LAMP." Alternatively, the same voice command being received in the living room can be transcribed as "TURN OFF LIGHTS" with a corresponding action for the robot 110 to turn off the object "CEILING LIGHTS." In this example, the robot 110 uses location-specific information included within the inventory 220 to differently transcribe the same voice query in different locations of the property 210 when a user's command is unclear.

Figure 3:
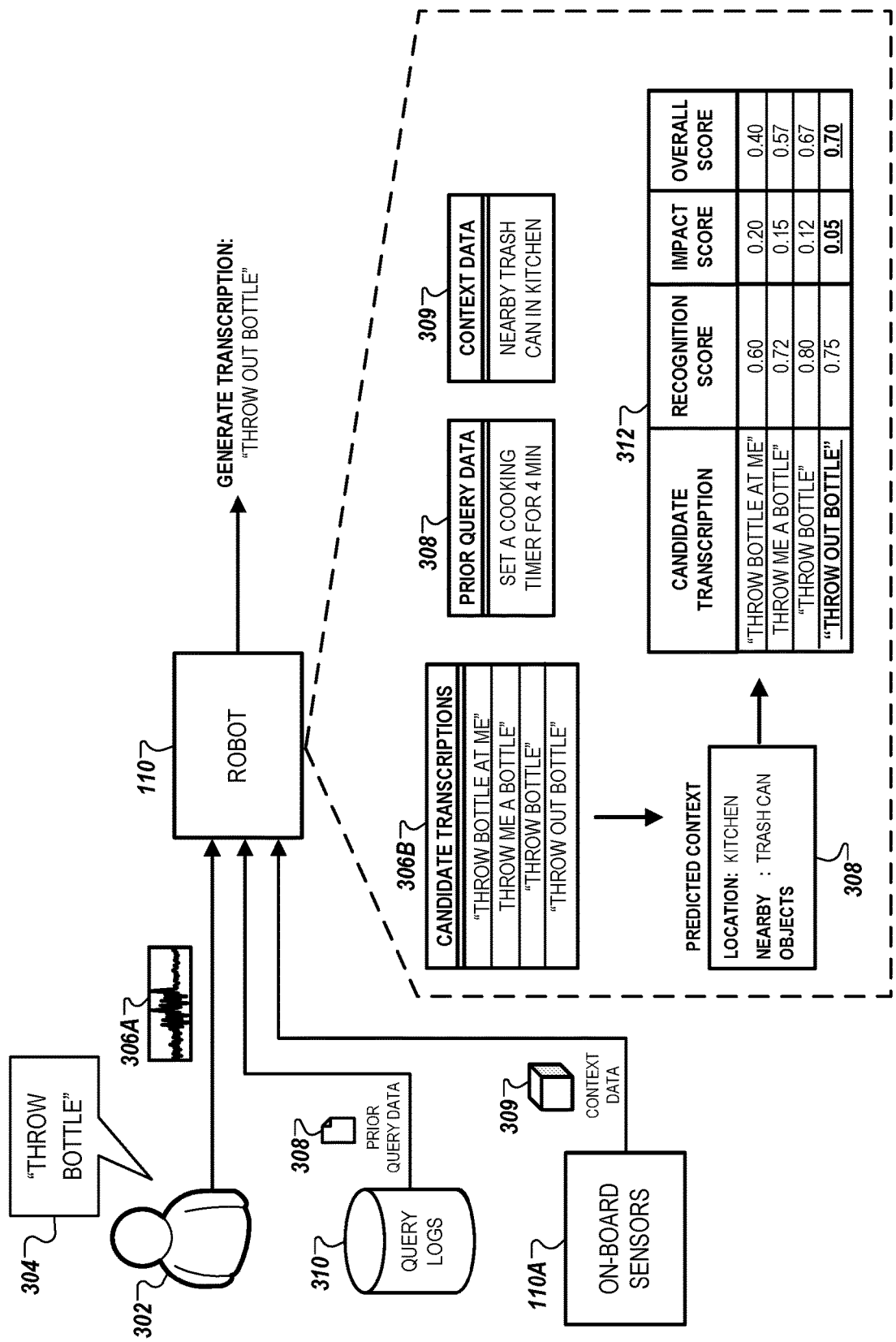
FIG. 3 is a schematic diagram that illustrates an example of a biasing technique used by a robot based on an environment determined around the robot.

FIG. 3 is a schematic diagram that illustrates an example of a biasing technique used by the robot 110 based on an environment determined around the robot 110. As discussed above, the robot 110 can identify environmental cues such as the location of the robot 110, objects within a proximity to the location, patterns of commands performed over a period of time among others. The environmental cues are used to improve the transcription of a voice query 304 and perform an action that appropriate based on the identified environmental cues as discussed below.

In the example depicted in FIG. 3, the robot 110 biases speech transcription of the voice query 304 based on environmental cues identified from data received from different sources. The robot 110 obtains audio data 306A that encodes the voice query 104 provided by a user 304. In this example, the voice query 304 is a spoken instruction to perform an action "THROW BOTTLE." The robot 110 accesses query logs 310 to obtain prior query data 308 indicating a set of queries that were previously sent by the user 102. The robot 110 also obtains context data 309 collected by on-board sensors 110A of the robot 110. The on-board sensors 110A can include video cameras, laser sensors, motion sensors, or any other type of suitable sensor.

The robot 110 processes the audio data 306A, the prior query data 308, and context data 309 to identify cues about an environment of the robot 110. For example, the robot 110 uses speech recognition techniques to identify a set of candidate transcriptions 306B in a manner similar to the techniques previously described with respect to FIG. 1. As depicted, the candidate transcriptions 306B includes a set of alternative transcriptions identified for the voice query "THROW BOTTLE."

The robot 110 also determines that the prior query data 308 includes a prior spoken instruction submitted by the user 302 to set a cooking time for four minutes. In the example depicted in FIG. 3, the prior query data 308 includes all prior queries submitted by the user 302 within a specified time period, e.g., within the last hour. Additionally, the robot 110 determines that the context data 309 indicates that the robot 110 is presently located in the kitchen of the property and that a trash can is nearby the location of the robot 110 within the kitchen. In this example, the context data 309 includes a map of the robot's surroundings, and an inventory that specifies objects identified in different regions of the property.

The robot 110 uses the environmental cues indicated within the prior query data 308 and the context data 309 to identify a predicted context 308 for the robot's environment. In the example depicted in FIG. 3, the predicted context 308 indicates a present location of the robot 110 being the "KITCHEN," and an object "TRASH CAN" that is determined to be nearby the present location of the robot 110. The predicted context 308, in this example, is determined based on the prior query data 308 including a prior spoken instruction relating to a cooking operation performed by the user 302, and the context data 309 including data collected by the on-board sensors 110A indicating that the environment surrounding the robot 110 resembles the kitchen.

The robot 110 computes a recognition score, an impact score, and overall score for each candidate transcription included within the candidate transcriptions 306B, which is specified within table 312. As discussed above, the recognition score generally reflects a determined likelihood that a particular candidate transcription represents an accurate transcription for the voice query 304 given a set of acoustic features identified for the audio data 306. For example, the recognition score for the candidate transcription "THROW BOTTLE" has the highest value amongst the recognition scores for the other candidate transcriptions because it more closely resembles that actual spoken instruction provided by the user 302.

The impact score, in this example, represents a determined likelihood that the mobile robot 110 performing an action corresponding a particular candidate transcription will cause physical injury to the user 302. For example, the impact score for the candidate transcription "THROW BOTTLE AT ME" has the highest value amongst the impact scores for the other candidate transcriptions because performing the corresponding action would result in the robot 110 throwing a physical object at the user 302. Alternatively, the impact score for the candidate transcription "THROW OUT BOTTLE" has the lowest value because performing the corresponding action would result in the robot 110 disposing of the bottle in the nearby trash can.

The robot 110 computes the overall score for each candidate transcription based on combing the recognition score and the impact score. In the example depicted in FIG. 3, the robot 110 computes the overall score by subtracting the value of the impact score from the value of the corresponding recognition score. For instance, the value of the overall score for the candidate transcription "THROW BOTTLE AT ME" is "0.40" based on subtracting "0.20" from "0.60." In other implementations, the robot 110 can combine the recognition score and the impact score using other combining techniques. For example, in the example depicted in FIG. 1, the robot 110 computes the overall score based on computing an average of the recognition score and the impact score. In other implementations, the robot can use a weighting technique to adjust the value of the recognition score to increase and/or reduce the probability of selecting a candidate transcription based on the value of the impact score.

The robot 110 selects a candidate transcription from among the candidate transcriptions included within the table 312 to transcribe the voice query 304. In the example depicted in FIG. 3, the robot 110 selects the candidate transcription "THROW OUT BOTTLE," that has the highest overall score amongst the overall scores for the other candidate transcriptions. In this example, although the candidate transcription "THROW BOTTLE" more accurately represents the accurate transcription for the actual spoken command provided by the user 302, the robot 110 nonetheless transcribes the voice query using the selected candidate transcription because it is more likely to result in performing an action that was intended to be performed by the user 302.

As depicted, the biasing technique illustrated in FIG. 3 can be used to improve the likelihood of accurately transcribing an incomplete and/or ambiguous spoken command based on using environmental cues to infer what a user may have intended provide as an actual command. In the example depicted in FIG. 3, for instance, the robot 110 uses prior query data and context data to infer that the spoken command relates to disposing trash because the user was previously detected to be cooking and because the robot 110 is determined to be located in the kitchen nearby an object that is likely to be associated with cooking.

Figure 4:
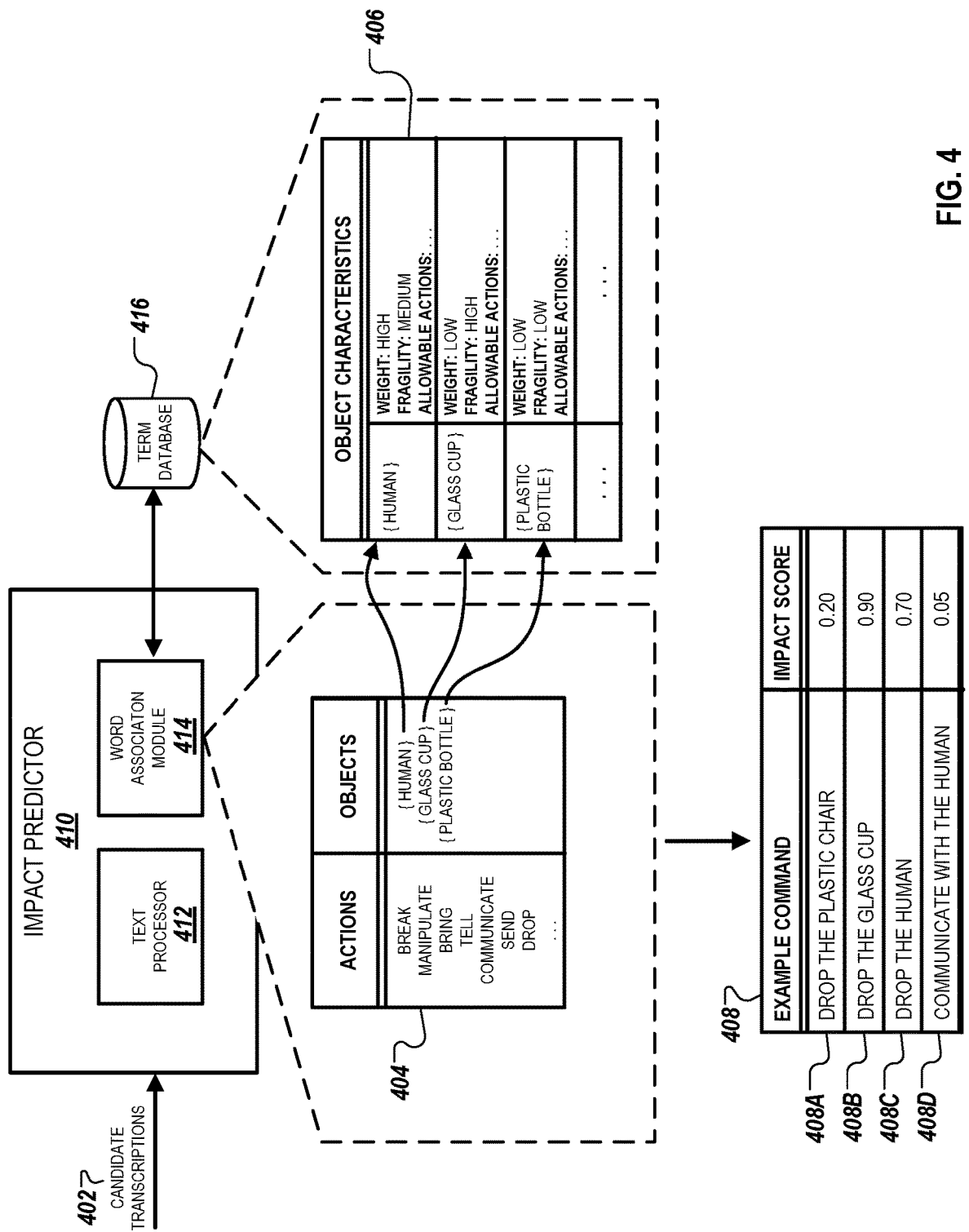
FIG. 4 is a schematic diagram that illustrates an example of a technique used by a robot to compute impact scores characterizing potential outcomes of performing actions.

FIG. 4 is a schematic diagram that illustrates an example of a technique used by the robot 110 to compute impact scores characterizing potential outcomes of performing actions. The illustrated technique can be performed by an impact predictor 410 that includes a text processor 412 and a word association module 414, which access a term database 416. The impact predictor 410 can be implemented as a software component of the robot 110, a software component of an associated server system, or a combination of both. In one example, the impact predictor 410 runs locally on the robot 110 but accesses data, e.g., word association data, from an associated server.

In general, the impact predictor 410 determines one or more impact scores indicating characteristics of a potential outcome of performing actions corresponding to the candidate transcription of the audio data. As discussed above, the impact scores represent respective likelihoods that a potential outcome will result in a particular determined result, either negative or positive. The impact predictor 410 computes the values of the impact scores by associating terms within a candidate transcription to evaluate the likelihood of a potential outcome taking place based on, for example, word associations, rules governing permissible or impermissible actions/outcomes, among others. As an example, the potential outcome might indicate whether an action will result in injury to the user and/or damage to a property, whether damage resulting from an action is reversible or irreversible, and/or whether performing the action will cause one or more undesirable consequences.

As shown in the examples depicted in FIG. 4, to assess the potential outcome of a particular action, the impact predictor 410 associates combinations of terms that are actions and terms that are objects and evaluates the associations in relation to a set of predetermined object characteristics. The impact predictor 410 then determines a potential outcome for each action-object association and uses the associations to determine impact scores for each candidate transcription as discussed above.

In the example depicted in FIG. 4, the impact predictor 410 initially receives candidate transcriptions 402 generated by the ASR 112 depicted in FIG. 1. As discussed above, the candidate transcriptions 402 can represent alternative transcriptions for audio data 106 encoding an utterance within the voice query 104. The text processor 412 processes the candidate transcriptions 402 to identify terms included within each candidate transcription. For example, the text processor 412 may use natural language processing (NLP) techniques to identify the presence of certain terms within each of the candidate transcriptions 402.

The word association module 414 determines associations between terms identified by the text processor 412 within each of the candidate transcriptions 414. For example, the word association module 414 identifies terms that represent actions to be performed by the robot 110, and terms that refer to objects that are the target of the actions to be performed by the robot 110. In the example depicted in FIG. 4, the word association module 414 generates an association table 404 that classifies certain terms as "ACTIONS" and other terms as "OBJECTS." In this example, terms identified as actions include physical actions, e.g., "BREAK," "MANIPULATE," "DROP," as well as actions relating to communication, e.g., "TELL," "COMMUNICATE," and actions that have different semantic representations based on the object to be acted upon, e.g., "SEND."

The word association table 404 also identifies objects that may be the target of an action specified within candidate transcription. The prediction module 410 identifies different potential outcomes depending on the action and the object specified within an association. For example, the association between the action "BREAK" and the object "HUMAN," can result in the determination of a more negative potential outcome compared to the association between the action "BREAK" and the object "PLASIC BOTTLE."

The word association table 404 also accesses the term database 416. The term database 416 stores object characteristics table 406 that specifies a set of predetermined characteristics for a list of known objects. The predetermined characteristics can represent different attributes of each object that the impact predictor 410 evaluates when computing impact scores for actions corresponding to candidate transcriptions. As examples, such characteristics can include weight and fragility, which represent how manipulation of an object can result in different consequences with respect to damage to the object. In some other examples, the attributes can specify a set of allowable actions and/or a set of unallowable actions. For instance, the characteristics for an object "GLASS CUP" can include unallowable actions relating to throwing, passing, or moving quickly due to its high fragility. In another instances, the characteristics for an object "HUMAN" can include allowable actions for communicating, responding to instructions.

In some implementations, the word association table 404 and the object characteristics table 406 identify object categories as opposed to objects themselves. For example, the word association table 404 can specify an object category "{HUMAN}" so that the impact predictor 410 can determine that a candidate transcription includes the object category if a corresponding voice query includes a reference to a person such as "JOE," "SARAH," "HIM," "HER, etc." In another example, the word association table can specify generalized object queries such as "{CHAIR}" as opposed to "(PLASTIC CHAIR)" so that the impact predictor 410 can determine that a candidate transcription includes the object category if a corresponding voice query includes a partial identifier terms such as "CHAIR" or "CUP."

The impact predictor 410 evaluates the data within the word association table 404 and the object characteristics 406 to compute impact scores for actions that correspond to candidate transcriptions. Examples of such actions and their corresponding impact scores are represented in command table 408. In these examples, the impact scores each represent a respective likelihood that performing a corresponding command is likely to cause damage to the object referenced within the command.

As shown in FIG. 4, the command table 408 includes commands 408A, 408B and 408C, which all involve the action "DROP," but different objects "PLASTIC CHAIR," "GLASS CUP," and "HUMAN," respectively. The command table 408 also includes a command 408D, which involves the same object as command 408C, e.g., "HUMAN," but involves a different action, e.g., "COMMUNICATE."

Comparing impact scores for the commands 408A-408C, the impact predictor 410 determines the highest impact score for command 408 because the object "GLASS CUP" is identified in the object characteristics table 406 as highest fragility. The impact predictor 410 also determines a high impact score for the command 408C because the object "HUMAN" has a high weight, which is then used to determine a high risk of injury to the user. Additionally, comparing the impact scores for commands 408C and 408D, the impact predictor 410 determines a low impact score for command 408D because the action "COMMUNICATE" involves a lower risk of physical injury to the object "HUMAN" compared to the action "DROP."

Figure 5:
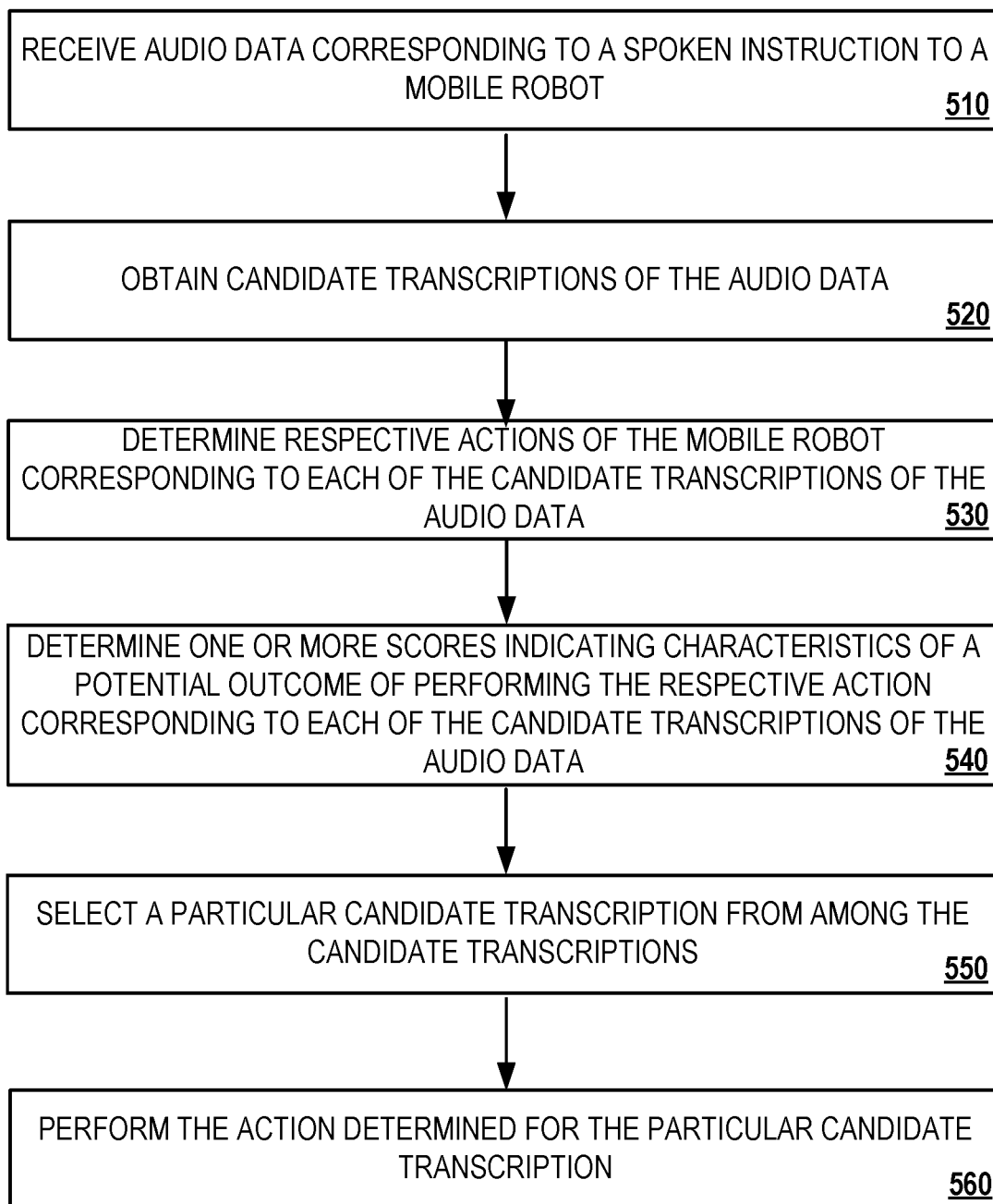
FIG. 5 is a flowchart that illustrates an example of a process for biasing speech recognition using environmental cues.

FIG. 5 is a flowchart that illustrates an example of a process 500 for biasing speech recognition using environmental cues. In general, the process 500 can include the operations of receiving audio data corresponding to a spoken instruction to a robot (510), obtaining candidate transcriptions of the audio data (520), determining respective actions of the robot corresponding to each of the candidate transcriptions of the audio data (530), determining one or more scores indicating characteristics of a potential outcome of performing the respective action corresponding to each of the candidate transcriptions of the audio data (640), selecting a particular candidate transcription from among the candidate transcriptions (650), and performing the action determined for the particular candidate transcription (560).

The process 500 is described below in reference to system 100, although other systems may be configured to perform the operations of the process 500. In one example, the operations of the process 500 can be performed by the robot 110 in response to receiving a voice query. In another example, the operations of the process 500 can be performed by an associated server system that is in communication with the robot 110 over a network, e.g., the Internet.

In more detail, the process 500 can include the operation of receiving audio data corresponding to a spoken instruction to a robot (510). For example, the system 100 can receive audio data 106 corresponding to a voice query 104 submitted and to the robot 110 by the user 102. The system 100 can process the audio data 106 to identify a speech utterance provided by the user 102. For example, the ASR 112 can process the audio data 106 using recognition data 112*a* to recognize speech corresponding to the utterance. The recognition data 112*a* can include an acoustic model, a language model, and/or other components that are used to extract acoustic features present within the audio data 106.

In some implementations, the system 100 receives context data that can include, for example, the location of the robot 110 within a property and one or more objects that are within a threshold proximity to the location of the robot within the property. The context data can be used by the robot 110 to identify cues relating to the environment of the robot 110 when receiving the spoken instruction. For instance, in the example depicted in FIG. 2, the robot 110 uses the inventory 220 to identify a set of n-grams that are associated with its present location and a set of objects that are nearby its present location.

In some implementations, the context data is collected by one or more on-board sensors of the robot such as video cameras, laser sensors, motion detection sensors, proximity sensors, among others. In other implementations, the context data is received from one or more associated electronic devices that are located within the property and are in communication with the robot 110. For example, the robot 110 can exchange proximity-based communications with a paired electronic device, e.g., a Bluetooth device, a location beacon, or a smartphone, to determine when it is located close to the paired electronic device.

The process 500 can include the operation of obtaining candidate transcriptions of the audio data (520). For example, the system 100 can obtain candidate transcriptions 109*a-c* of the audio data 106 that are generated by the ASR 112. Each candidate transcription can represent, for instance, an alternative transcription of the audio data 106. For example, in the example depicted in FIG. 1, the candidate transcriptions 109*a-c* refer to alternative transcriptions for the utterance "SH-AK-EH MY KA-AN," including "SHAKE MY CAN," "BREAK MY CAN," and "SHAKE MY CAR."

The process 500 can include the operation of determining respective actions of the robot corresponding to each of the candidate transcriptions of the audio data (530). For example, the system 100 can determine a respective action of the robot 110 corresponding to each of the candidate transcriptions 109*a-c* of the audio data 106. Each action can refer to an action that the robot 110 performs in response to transcribing the voice query 104 using the corresponding candidate transcription. In some implementations, the action is determined based on a spoken instruction specified by the candidate transcription. For example, in the example depicted in FIG. 1, the action corresponding to the candidate transcription "SHAKE MY CAN" is an instruction for the robot 110 to approach the location of an object to initiate an object interaction.

The process 500 can include the operation of determining one or more scores indicating characteristics of a potential outcome of performing the respective action corresponding to each of the candidate transcriptions of the audio data (540). For example, the system 100 can compute impact scores that represent characteristics of the potential outcome of each respective action of the candidate transcriptions. In the example depicted in FIG. 1, the impact scores represent a likelihood that performing a respective action will not result in physical injury to the user 102. For example, the impact score computed for the candidate transcription 109*a* has a higher value compared to the impact score computed for candidate transcription 109*b* because its corresponding object interaction by the robot 110 is less likely to cause physical damage than the object interaction corresponding to the other candidate transcriptions. In other examples, the impact scores can represent broad classes of effects resulting from the robot 110 performing actions corresponding to the candidate transcriptions. For example, the impact scores can reflect both the likelihoods of positive outcomes and negative outcomes.

In some implementations, impact scores for the potential outcome of performing the respective action corresponding to each of the candidate transcriptions 109*a-c* of the audio data 106 represents a respective likelihood that performing the respective action will cause injury to the user 102 that provides the voice query 104, e.g., a spoken instruction, to the robot 110. Alternatively, in other implementations, the potential outcome can represent a likelihood that the outcome will be positive, e.g., performing an action that is determined to be responsive to a spoken instruction provided by the user 102.

The process 500 can include the operation of selecting a particular candidate transcription from among the candidate transcriptions (650). For example, the system 100 selects a particular candidate transcription from among the candidate transcriptions 109*a-c* based at least the one or more scores indicating characteristics of the potential outcomes of performing the actions corresponding to the candidate transcriptions 109*a-c*. The particular candidate transcription can be selected using a scoring technique that considers both a recognition score, e.g., a determined likelihood that the particular candidate transcription is an accurate transcription of the voice query 104, and an impact score, e.g., a determined likelihood that performing an action corresponding to the particular candidate transcription will not cause a potential negative outcome. In the example depicted in FIG. 1, the candidate transcription selector 114 selects the candidate transcription 109*a* based on its overall score being greater than the overall scores for the other candidate transcriptions.

In some implementations, the scoring technique used to select a particular candidate transcription from among the candidate transcriptions 109*a-c* for the audio data 106 can include determining whether the potential outcome of performing the particular actions corresponding to the candidate transcriptions 109*a-c* is included among a set of undesirable outcomes that is associated with the robot 110. Examples of undesirable outcomes include outcomes that are likely to cause physical injury to the user 102, outcomes that are likely to cause damage to the property, outcomes that are unlikely to be responsive to the spoken instruction, outcomes that are unlikely to be successfully completed by the robot 110, or outcomes that do not match the pattern of prior outcomes for previously performed actions, among others.

The process 500 can include performing the action determined for the particular candidate transcription (560). For example, the system 100 transmits an instruction to the robot 110 to perform the action determined for the particular candidate transcription 109*a* selected from among the candidate transcriptions 109*a-c*. In the example depicted in FIG. 1, the query response generator 118 transmits an instruction for the robot 110 to approach the location of the object to initiate an object interaction, which corresponds to the selected transcription of "SHAKE MY CAN" for the voice query 104.

Figure 6:
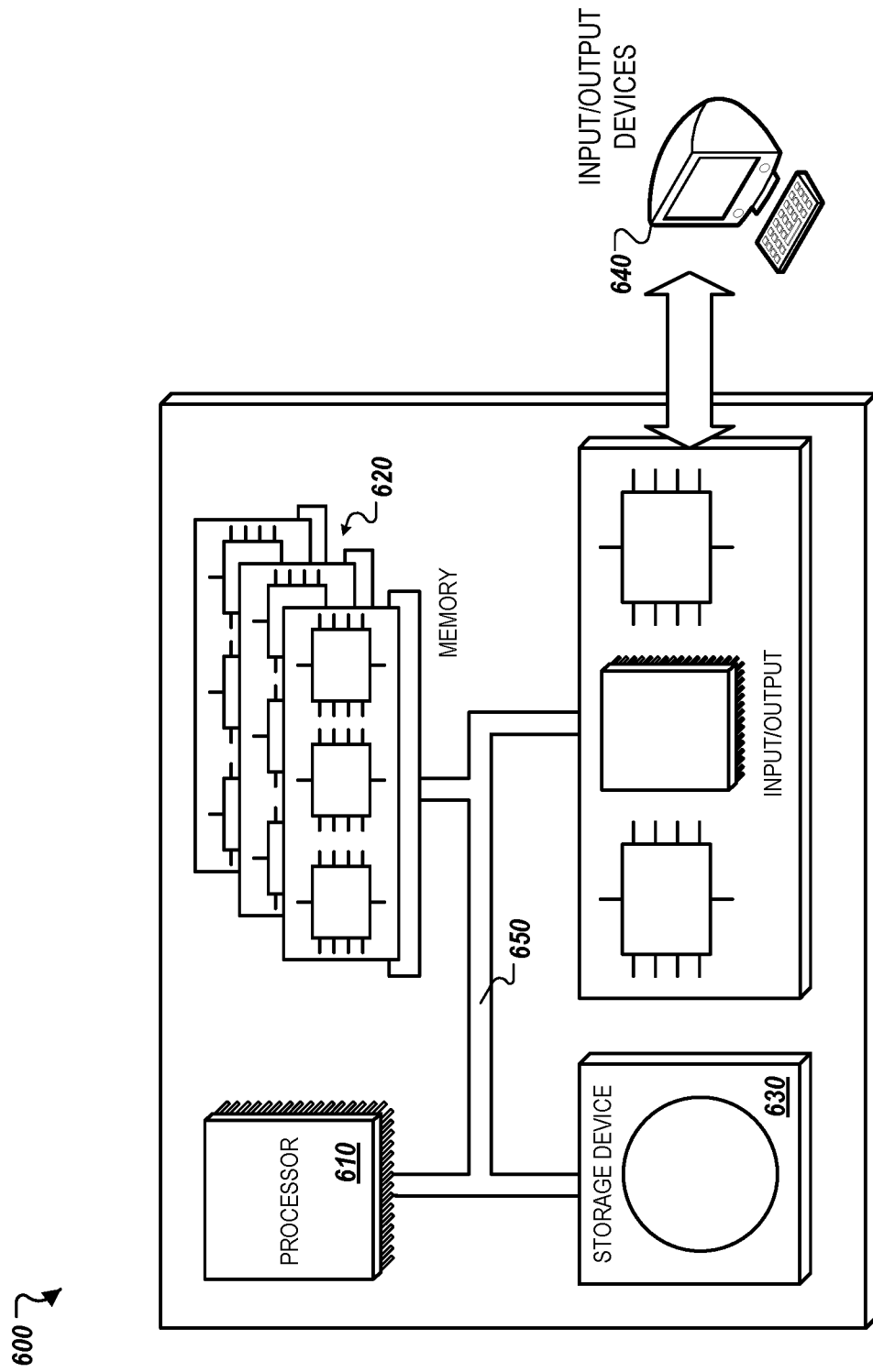
FIG. 6 illustrates a schematic diagram of a computer system that may be applied to any of the computer-implemented methods and other techniques described herein.

FIG. 6 illustrates a schematic diagram of a computer system 600 that may be applied to any of the computer-implemented methods and other techniques described herein. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 640. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   receiving audio data corresponding to a spoken instruction to a robot;
   obtaining a plurality of candidate transcriptions of the audio data;
   obtaining an inventory of objects identified nearby the robot;
   determining, for each of the plurality of candidate transcriptions of the audio data, a respective likelihood score, wherein the respective likelihood score for a candidate transcription is increased when the candidate transcription refers to an object in the inventory of objects identified nearby the robot;
   selecting a particular candidate transcription from among the plurality of candidate transcriptions based at least on the respective likelihood score determined for each of the plurality of candidate transcriptions; and
   causing the robot to perform an action based on the selected particular candidate transcription.

2. The method of claim 1, wherein the inventory of objects is limited to objects currently in view of the robot.

3. The method of claim 1, wherein the inventory of objects is limited to objects within a predetermined distance of the robot.

4. The method of claim 1, wherein the inventory of objects is limited to objects identified by the robot within a certain amount of time.

5. The method of claim 1, further comprising determining a position of the robot, wherein determining the respective likelihood score for each of the plurality of candidate transcriptions of the audio data is further based on the determined position of the robot.

6. The method of claim 1, further comprising:
   detecting, by the robot, one or more objects; and
   determining a position of the robot relative to known locations of the one or more detected objects, wherein determining the respective likelihood score for each of the plurality of candidate transcriptions of the audio data is further based on the determined position of the robot relative to the known locations of the one or more detected objects.

7. The method of claim 1, further comprising determining an inventory of n-grams comprising terms or phrases that are likely to be included in queries received by the robot in different regions, wherein determining the respective likelihood score for each of the plurality of candidate transcriptions of the audio data is further based on the inventory of n-grams.

8. The method of claim 7, further comprising determining a position of the robot, wherein determining the respective likelihood score for each of the plurality of candidate transcriptions of the audio data is based on region n-grams from the inventory of n-grams, wherein the region n-grams are specified based on the position of the robot.

9. The method of claim 1, further comprising identifying the objects in the inventory of objects during an initial registration phase when the robot scans a physical environment of a property and classifies objects to identify presence of objects within specified regions of the property.

10. The method of claim 9, further comprising causing the robot to periodically scan the property to update the inventory of objects by identifying changes to locations of previously identified objects within the property or detecting newly identified objects within the property.

11. The method of claim 1, further comprising determining the action for the robot to perform based on one or more objects from the inventory of objects which are identified in the selected particular candidate transcript.

12. The method of claim 1, wherein the determined respective likelihood score for each of the plurality of candidate transcriptions of the audio data comprises a respective recognition score, the method further comprising determining a respective impact score for each of the plurality of candidate transcriptions of the audio data based on a potential impact of the robot performing a corresponding action.

13. The method of claim 12, further comprising determining a respective combined score for each of the plurality of candidate transcriptions of the audio data based on the respective recognition score and the respective impact score.

14. The method of claim 13, further comprising determining the action for the robot to perform based on the determined respective combined score for each of the plurality of candidate transcriptions of the audio data.

15. The method of claim 13, wherein the respective combined score for each of the plurality of candidate transcriptions of the audio data is determined by subtracting the respective impact score and the respective recognition score.

16. The method of claim 13, wherein the respective combined score for each of the plurality of candidate transcriptions of the audio data is determined by weighting the respective recognition score based on the respective impact score.

17. A robot comprising:

one or more processors; and one or more storage devices storing instructions that, when executed by the one or more processors, cause the one or more processors to perform operations comprising:

receiving audio data corresponding to a spoken instruction to the robot;

obtaining a plurality of candidate transcriptions of the audio data;

obtaining an inventory of objects identified nearby the robot;

determining, for each of the plurality of candidate transcriptions of the audio data, a respective likelihood score, wherein the respective likelihood score for a candidate transcription is increased when the candidate transcription refers to an object in the inventory of objects identified nearby the robot;

selecting a particular candidate transcription from among the plurality of candidate transcriptions based at least on the respective likelihood score determined for each of the plurality of candidate transcriptions; and causing the robot to perform an action based on the selected particular candidate transcription.

18. The robot of claim 17, wherein the operations further comprise periodically scanning an environment to update the inventory of objects.

19. The robot of claim 17, wherein the operations further comprise:

detecting, by the robot, one or more objects; and determining a position of the robot relative to known locations of the one or more detected objects, wherein determining the respective likelihood score for each of the plurality of candidate transcriptions of the audio data is further based on the determined position of the robot relative to the known location of the one or more detected objects.

20. One or more non-transitory computer-readable media storing instructions that, when executed by one or more computing devices, cause the one or more computing devices to perform operations comprising:

receiving audio data corresponding to a spoken instruction to a robot;

obtaining a plurality of candidate transcriptions of the audio data;

obtaining an inventory of objects identified nearby the robot;

determining, for each of the plurality of candidate transcriptions of the audio data, a respective likelihood score, wherein the respective likelihood score for a candidate transcription is increased when the candidate transcription refers to an object in the inventory of objects identified nearby the robot;

selecting a particular candidate transcription from among the plurality of candidate transcriptions based at least on the respective likelihood score determined for each of the plurality of candidate transcriptions; and causing the robot to perform an action based on the selected particular candidate transcription.

* * * * *